United States Patent [19]

Feher

[11] Patent Number: 4,923,149
[45] Date of Patent: May 8, 1990

[54] PARACHUTE FOOT SUPPORT STIRRUP

[76] Inventor: Kalman Feher, 285 DuTour, Laval, Quebec, Canada, H7Y 1H3

[21] Appl. No.: 267,824
[22] Filed: Nov. 7, 1988
[51] Int. Cl.⁵ .............................................. B64D 17/30
[52] U.S. Cl. ............................................... 244/151 R
[58] Field of Search ........................ 244/151 R, 151 A

[56] References Cited

U.S. PATENT DOCUMENTS 1,349,513  8/1920  Koza ............................... 244/151 R

FOREIGN PATENT DOCUMENTS 724519  4/1932  France ............................ 244/151 R
350963  7/1937  Italy ................................ 244/151 R
749717  5/1956  United Kingdom ............ 244/151 R Primary Examiner—Galen Barefoot

[57] ABSTRACT

A parachute foot support stirrup for preloading the leg muscles of a parachutist. The foot support stirrup comprises a strapping member defining a footrest portion dimensioned to receive the feet of the parachutist and an attachment portion for removable securement of the strapping member to a fixed attachment part located above the feet of the parachutist. The footrest portion provides a support means to maintain the leg muscles of the parachutist preloaded prior to the parachutist landing on solid ground.

20 Claims, 4 Drawing Sheets

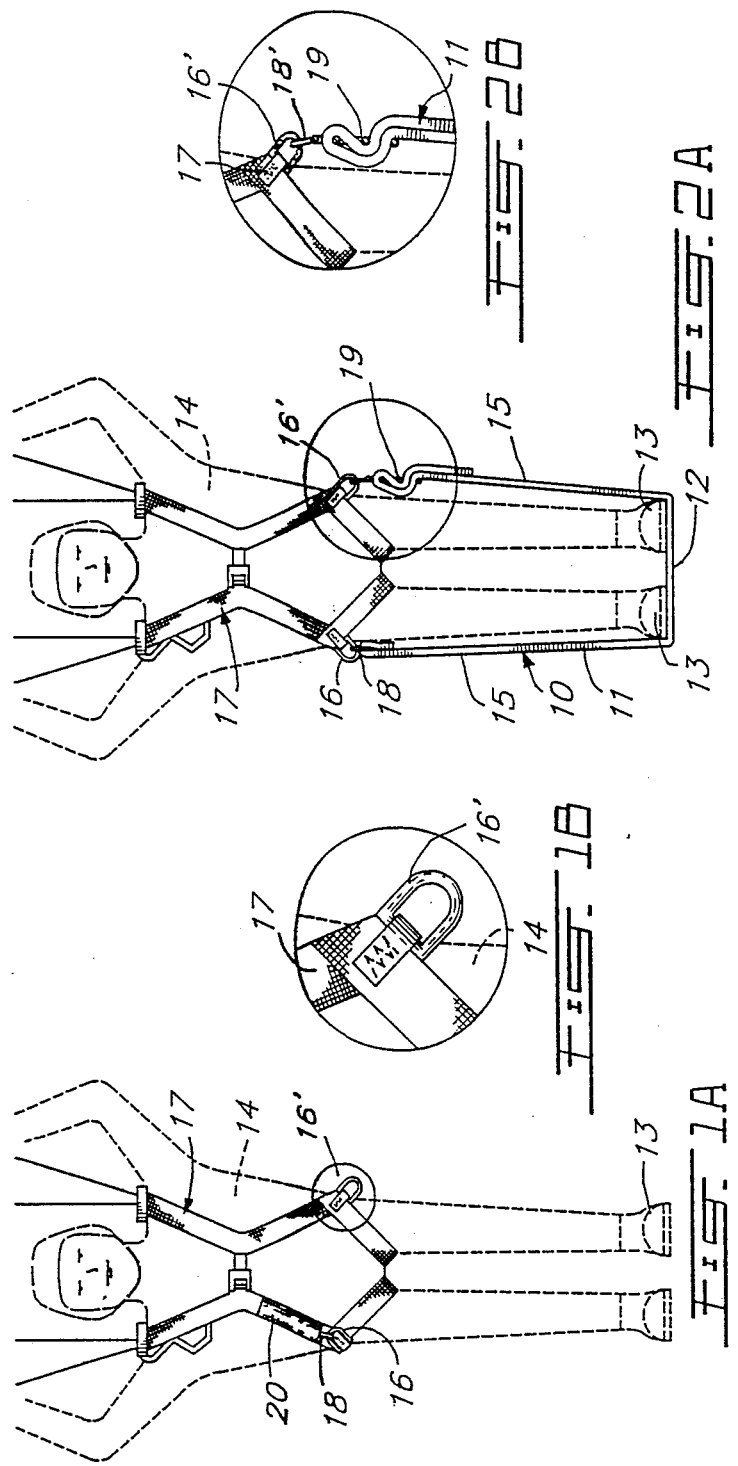

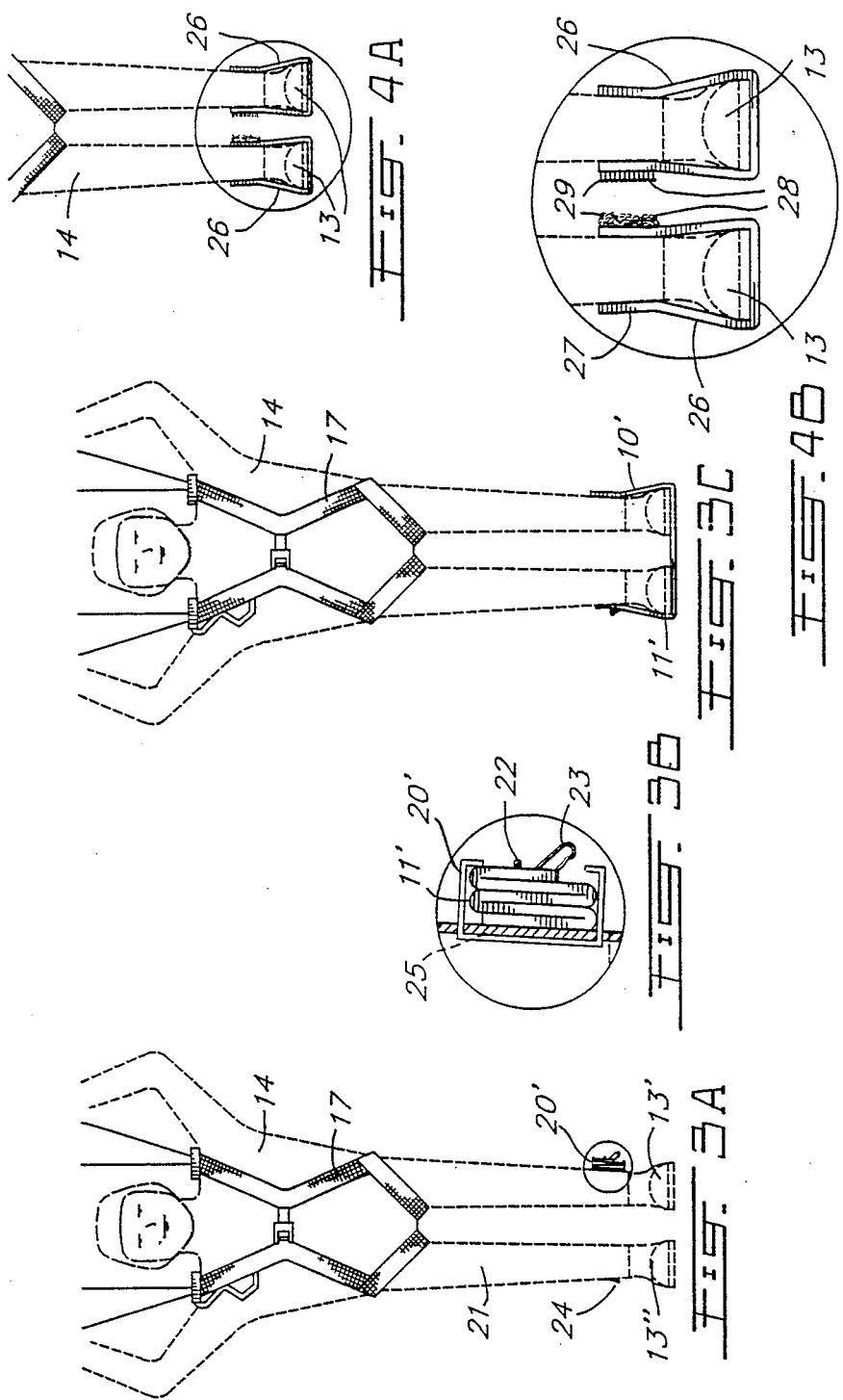

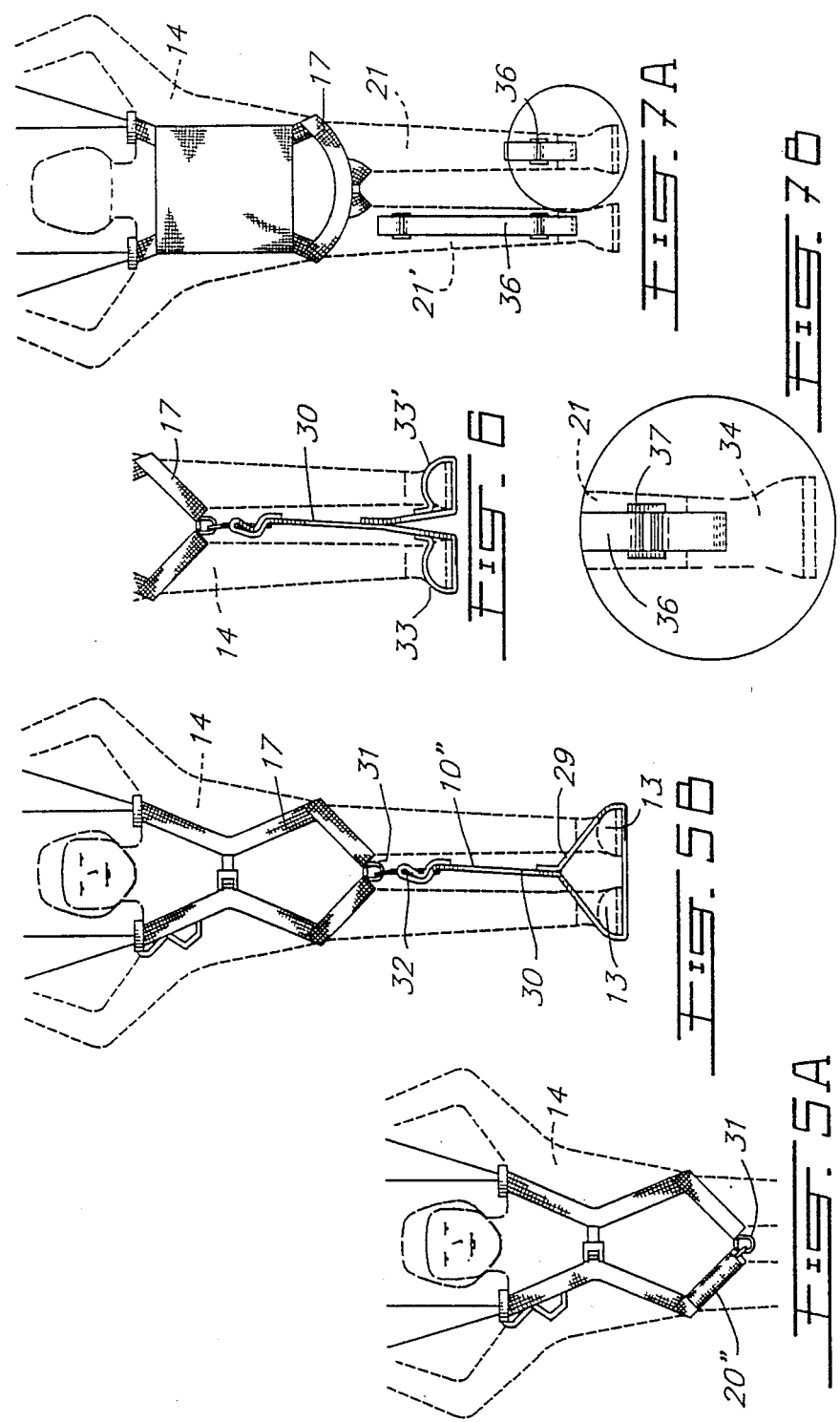

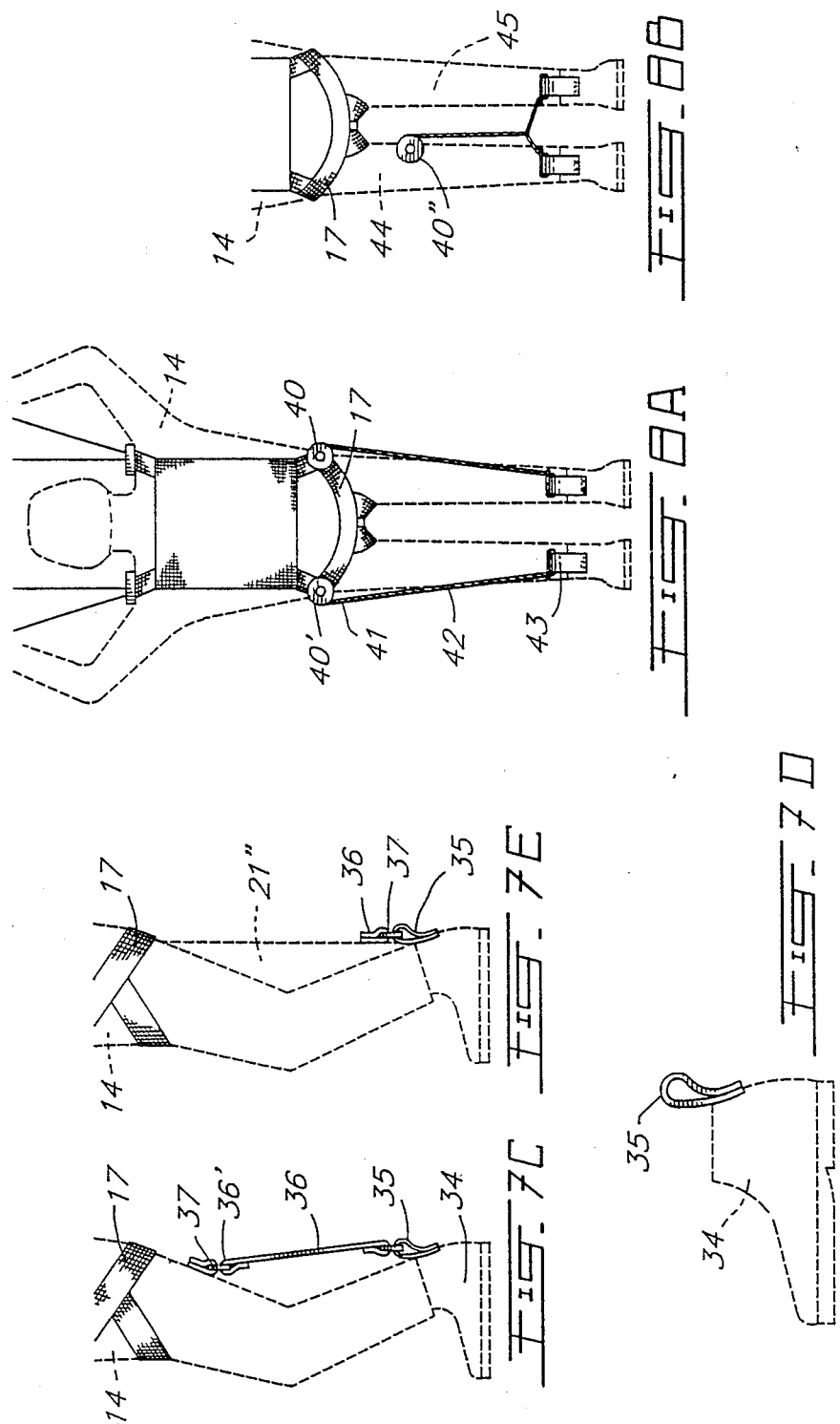

PARACHUTE FOOT SUPPORT STIRRUP

BACKGROUND OF INVENTION

1. Field of Invention

The present invention relates to a parachute foot support stirrup for preloading the leg muscles of a parachutist prior to his landing on solid ground.

2. Description of Prior Art

Exercising a muscle involves its repeated contraction and relaxation, usually with a view to strengthening it for the time when it may be needed. Strength in this case is the amount of force that the muscle might be able to exert, and elastic devices or springs are usually ideal for the purpose of "exercising".

Preloading a muscle, however, is an entirely different activity requiring similar yet rather distinct devices. When one jumps off a chair, the interval of time from muscle relaxation which begins at the moment of resistance-removal (lift off) to the time of impact is so short that the muscles retain some preload allowing them to absorb the loads of landing impact with respectable if far from perfect efficiency. If one jumped off a higher structure under reduced gravity such as from a building on the moon, then the landing impact would be about the same but the time airborne would greatly increase and the muscles would retain none of of the preload described above. This is exactly what happens in a parachute landing. Impact forces are not all that great and they compare with jumping off from relatively low structures, but the amount of time spent hanging in the harness that supports the torso while it leaves the legs hanging limp is far greater. Come time to absorb landing impact, the limp legs, even if cautiously bent, will normally collapse significantly before becoming able to exert force. Force cannot be exerted against a void and the muscles cannot even begin to load until resistance in the form of terrafirma is encountered. At that moment, they begin to build up force but the process takes time and taxes heavily the time available before the legs become fully collapsed. Some absorption is generated, but it can be greatly increased by using the parachute foot support stirrup of the prresent invention. Landing with straight legs, preloaded or limp, can result in incapacitating injury.

The stirrup of the present invention provides the equivalent of a harness in which the occupant figuratively stands during descent and even in the absence of a will to preload the leg muscles will do just that by virtue of the legs having to support the weight of the body. In the case of a conscious occupant, from a forces-in-action perspective, this arrangement would nearly equal standing on the ground with most body muscles similarly preloaded. Furthermore, because the upper part of the torso is restrained by the harness and/or clothing while the feet are restrained by the stirrup and the two combined form the necessary containment geometry, forces considerably greater than the weight of the body can be exerted at will.

This act would be an expected course to follow just prior to landing when landing can be closely predicted. A more continuous and vaguely aimed effort would apply when the time of landing cannot be closely predicted, such as at night or when landing into forests, etc.

Since exercising devices using elastic materials neither allow the application of larger forces, nor provide containment geometry to prevent the legs from straightening, unless stretched to the limit at which time their use becomes futile, and since the stirrup provides these objectives not only without but specifically excluding the use of elastic materials, the exercising devices made of elastic materials cannot deliver these objectives. The two concepts are totally foreign one to another.

SUMMARY OF INVENTION

It is a feature of the present invention to provide a parachute foot support stirrup for preloading the leg muscles of a parachutist prior to the parachutist landing on solid ground thereby reducing injury and permitting the parachutist to react more quickly as soon as he hits solid ground.

Another feature of the present invention is to provide a parachute foot support stirrup for preloading the leg muscles of a parachutist and wherein the stirrup is easy to install and use.

Another feature of the present invention is to provide a parachute foot support stirrup for preloading the leg muscles of a parachutist and wherein the stirrup is conveniently stowed away on the harness webbing of the parachute.

Another feature of the present invention is to provide a parachute foot support stirrup for preloading the leg muscles of a parachutist and wherein the stirrup is adjustable or can be automatically adjusted.

According to the above features, from a broad aspect, the present invention provides a parachute foot support stirrup for preloading the leg muscles of a parachutist. The foot support stirrup comprises a footrest member connected to a strapping member of non-stretchable material, said footrest being dimensioned to receive the feet of the parachutist and an attachment portion for removable securement of the strapping member to a fixed attachment part located above the feet of the parachutist. The footrest portion provides a support surface to maintain the leg muscles of the parachutist preloaded with bent legs prior to the parachutist landing on solid ground.

BRIEF DESCRIPTION OF DRAWINGS

A preferred embodiment of the present invention will now be described with reference to the accompanying drawings in which:

FIG. 1A is a schematic view of a parachutist wearing a parachute harness illustrating the foot support stirrup of the present invention stowed away in a sleeve pouch;

FIG. 1B is an exploded view showing one of the connector rings secured to the parachute harness for attaching the foot support stirrup;

FIG. 2A is a schematic view similar to FIG. 1A but showing the foot support stirrup secured in position of use;

FIG. 2B is an enlarged view showing the adjustable buckle for varying the length of the strapping member;

FIG. 3A is a schematic view similar to FIG. 1A but showing an alternative constructions of the foot support stirrup of the present invention;

FIG. 3B is an enlarged view showing a means of stowing the foot support stirrup in a sleeve pouch secured to the parachute harness;

FIG. 3C is a schematic view similar to FIG. 3A but showing the foot support stirrup secured in position of use;

FIG. 4A is a schematic illustration of the leg portions of a parachutist and on which a further embodiment of the foot support stirrup is illustrated;

FIG. 4B is an enlarged view of the foot support stirrup embodiment of FIG. 4A;

FIG. 5A is a schematic illustration of a further modification of the foot support stirrup showing a center-mounted stirrup stowed away in a sleeve pouch secured to the parachute harness;

FIG. 5B is a schematic illustration similar to FIG. 5A but illustrating the foot support stirrup in use;

FIG. 6 is a schematic illustration of a further variation of the embodiment of FIGS. 5A and 5B;

FIG. 7A is a schematic illustration showing a further embodiment of the foot support stirrup of the present invention and particularly showing two versions of that embodiment;

FIG. 7B is an enlarged view showing the construction of the foot support stirrup of one version of FIG. 7A;

FIG. 7C is a side view showing the other version of the foot support stirrup of FIG. 7A;

FIG. 7D shows a still further embodiment wherein the footrest portion is constituted by rigid boots;

FIG. 7E shows a further embodiment whereby the suit of the parachutist is modified to accommodate the foot support stirrup version of FIG. 7B;

FIG. 8A is a perspective view of a parachutist wearing the foot support stirrup secured by a reel member; and FIG. 8B is a further perspective view showing the reel member secured to a parachutist's suit.

DESCRIPTION OF PREFERRED EMBODIMENTS

Referring now to the drawings, and more particularly to FIGS. 1A to 2B, there is shown generally at 10 in FIG. 2A the foot support stirrup of the present invention for preloading the leg muscles of a parachutist. The foot support stirrup is herein comprised by a strapping member, herein a belt 11, which defines a footrest portion 12 dimensioned to receive the feet 13 of the parachutist 14. The belt 11 also defines attachment portions 15 to each side of the footrest portion 12 to immovably secure the strapping member or belt 11 to a fixed attachment part, herein connector rings 16 and 16', secured to the parachute harness 17 and located above the feet 13 of the parachutist 14. Thus, the footrest portion 12 provides a support means to maintain the leg muscles of the parachutist preloaded prior to the parachutist landing on solid ground.

The strapping member or belt 11 is constituted by a flexible strap of nonstretchable material. The strap 11 is further provided with detachable securement means at opposed ends thereof and herein provided by connector clamps 18 and 18' (see FIGS. 2A and 2B) for snap connection to the connecting rings 16 and 16' respectively. One end of the strap is also provided with adjustment means in the form of an adjustment buckle 19 whereby to vary the length of the strap to accommodate parachutists of different sizes. As can be seen, the harness of FIG. 2A forms a substantially U-shape harness and is easily securable during use.

When not in use the harness is folded away into a sleeve pouch 20 (see FIG. 1A) which is secured to the harness 17 immediately adjacent the connector ring 16. One end of the harness has its buckle 18 secured to the connector 16. By pulling on the clamp 18 the harness slips out of the sleeve pouch 20 and is looped around the feet with the other end of the harness attached to the connector 16', which is more clearly shown in FIG. 1B.

Referring now to FIGS. 3A to 3C, there is shown a still further embodiment of the foot support stirrup 10' of the present invention. As herein shown, the stirrup is constituted by a shorter strap 11' which is secured to the suit 21 of the parachutist above the feet 13'. The suit 21 is made of non-elastic and nonstretchable material whereby to provide a fixed attachment part for the strap 11'.

As shown in FIG. 3B the strap is folded in an accordion fashion and held by an elastic member 22. This accordion folded strap is also secured in a convenient pouch 20' providing immediate access to the connector clamp 23. A connector ring 24 is secured to the suit 21 adjacent the other leg 13". Accordingly, by pulling on the free end of the folded strapping 11' it is then pulled out of its pouch 20' and looped around the feet in the manner as shown in FIG. 3C with the connector clamp 23 secured to the connector ring 24. The other end 25 of the strap is immovably secured, such as with stitching, to the garment or suit 21 which is non-stretchable.

Referring now to FIGS. 4A and 4B, there is shown a still further embodiment or modification of FIG. 3C wherein the short strapping forms individual loops about each foot. Each of the strap loops 26 is secured at one end 27 to the suit 21 and is provided with a Velcro (Registered Trademark) portion 28 at the opposed end for securement to an attachment Velcro portion 29 secured to the suit 21. These Velcro attachment tabs also provide an adjustment portion whereby the strapping can be made taut to provide resistance against which force is exerted by the wearer. Although the Velcro portions are shown located in the inside part of the bottom portion of the leg, one may be on the inside part and the other on the outside part so that these Velcro tabs do not interfere with one another. Velcro material or conventional hardware may also be used in the inseam area to help hold the legs together in this particular application of the stirrup.

Referring now to FIGS. 5A and 5B, there is shown a still further embodiment wherein the foot support stirrup 10" has a different configuration and the footrest portion is provided by a loop 29 and the attachment portion is formed by an elongated attachment strap 30 secured to the loop 29 and attached at a free end to a connector clamp 31 at the center of the parachute harness 17. An adjustment buckle 32 is also provided adjacent the connector clamp to adjust the length of the strap 30. When not in use the stirrup 10" is stowed away in a sleeve pouch 20" secured to the harness adjacent the connector ring 31.

FIG. 6 shows a further modification of the embodiment of FIG. 5B and wherein there is provided two loops 33 and 33' instead of the single 29. Both loops are secured to the belt connecting portion 30 and the stirrup is secured to the harness 17 in the same manner as shown in FIG. 5B.

FIGS. 7A to 7E show still further embodiments of the foot support stirrup of the present invention. As herein shown, the footrest portion is constituted by a pair of rigid boots 34 (see FIG. 7D) with each boot being provided with a connector loop 35 in a rear upper portion thereof. Again, the leg sleeve 21' of the suit 21 is used as the fixed attachment part. Although the strapping member so far being referred to as a belt-type strapping element, it is also possible that this strapping member be a cable.

FIG. 7A illustrates two versions of this further embodiment wherein the strapping element 36 is provided with a connector 37 at one end thereof for attachment to the loop 35 of the boot 34, and a further connector 36 at an opposed end for connection to a connector ring 37 secured to the leg sleeve 21'. As shown in FIG. 7B, the strapping 36 may be a very short length strap, as above described, with reference to FIGS. 3A to 4B, or else be a longer strap as illustrated in FIG. 7C. Although the boot here shown is hooked at the heel portion, the user is actually limited at the toes, an important factor when attempting to maximize shock absorbing preloads that will preferably include those muscles springing the balls of the feet.

The only consideration involving the suitability of existing protective clothing arises in the connection being made at a point below the knees. In order to allow the required reduction in total stretch room necessary for the development of preload forces, a minimal amount of leg flexion must be accommodated. Since with this type of connection (below the knee) the legs cannot bend independently of external restraint devices, sufficient room must avail inside the leg sleeves of the suit 21'. The use of laterally oversized sleeves, as shown at 21" in FIG. 7E, is necessitated. Since any elastic material will limit the total force that can be exerted to body weight, nonelastic materials provide capacity limited only by the occupant's strength. The more force exerted, the better the preload. Theoretically, a perfect preload would allow the occupant to literally bounce off the ground upon landing although this is not required, as other parts of the body are more effective in absorbing impact forces not related to possible leg or hip trauma.

Referring now to FIGS. 8A and 8B, there is shown a still further embodiment of the adjustable means for adjusting the length of the strapping member. As herein shown, the adjustable means is provided the reeling devices 40 and 40' which are secured to the harness 17 whereby to secure the ends 41 of the strapping member 42. The free end of the strapping member 42 is provided with the footrest portion 43 which may have various configurations as described hereinabove. These reeling devices may be provided with brake means (not shown) to arrest the strapping member 42 to adjust its length for the particular user.

FIG. 8B illustrates a modified version of the strapping member with the reeling device 40" being secured to the nonelastic suit 44 at a position above the knee portion 45. When the strap is disconnected the reels retract the length of strapping or cable automatically.

It is within the ambit of the present invention to cover any other obvious modifications of the examples of the preferred embodiment described herein, provided such modifications fall within the scope of the appended claims. It is also conceivable that the foot support stirrup of the present invention be utilized in conjunction with automatic ejection seats of combat aircraft. Ejection seats employ sequenced heel retractors to save the legs of a pilot from being sheared off by overhanging structures in the cockpit. The reels 40 employed as part of the foot support stirrup configuration also serve as heel retractors if desired. Teleflexed heel retraction motor shafts can be spline-keyed into these reels to effectively retract the heels when ejecting. If and when the occupant separates or is in turn ejected from his seat, the drives slip out of the reels and they now assume their claimed function related to the foot support stirrup. Upon sensing spline withdrawal, the reel releases a length of cable longer than the retracted amount but shorter than the original floor-freedom length that had been accommodated while the feet were on the rudders. External or reel-crank adjustment for personal geometry can be made available with the embodiment described above.

Should an ejected occupant be unconscious at the moment of landing, the shortened cables will assure that the limp body does not hammer down on straight legs which would result in severe and either disabling or incapacitating injury, of particular importance in hostile territory.

A particular application of the parachute foot support stirrup of the present invention would be very advantageous for airborne troops wherein the individual would be practically instantaneously in leg motion as soon as he hits the ground due to the preloading of the muscles. Such would provide for faster regrouping of troops.

I claim:

1. A parachute foot support stirrup for preloading the leg muscles of a parachutist, said foot support stirrup comprising a footrest member connected to a strapping member of non-stretchable material, said footrest member being dimensioned to receive the feet of said parachutist and an attachment portion for immovable securement of said strapping member to a fixed attachment part located above the feet of said parachutist, said footrest member providing a support means to maintain the leg muscles of said parachutist preloaded with bent legs prior to the parachutist landing on solid ground.

2. A parachute foot support stirrup as claimed in claim 1 wherein said footrest member is integrally formed with said strapping member, said strapping member having at least an adjustable portion to adjust the length thereof intermediate said footrest member and said fixed attachment part.

3. A parachute foot support stirrup as claimed in claim 2 wherein said foot support stirrup is a flexible strap constructed of said nonstretchable material, said strap having detachable securement means at at least one end thereof to form a U-shaped harness defining said footrest member in the bottom portion of said harness with the side portions of said harness being interconnected to a respective one of said fixed attachment part.

4. A parachute foot support stirrup as claimed in claim 3 wherein opposed ends of said strap is provided with a connector clamp at opposed free ends thereof for attachment to a connector ring immovably secured to a parachute harness webbing.

5. A parachute foot support stirrup as claimed in claim 4 wherein said strap is stowed in a sleeve pouch provided on said webbing adjacent one of said connector ring with one of said connector clamp connected to said one of said connector rings.

6. A parachute foot support stirrup as claimed in claim 4 wherein an adjustment buckle is connected to said strap adjacent a connector clamp to provide for adjustment of the length of said strap.

7. A parachute foot support stirrup as claimed in claim 2 wherein said strap has a loop formed to constitute said footrest member, and an elongate attachment strap secured to said loop at one end and having a connector clamp at the other end for attachment to a parachute harness webbing.

8. A parachute foot support stirrup as claimed in claim 7 wherein there are two of said loops secured to said attachment strap, each loop receiving a foot of said parachutist.

9. A parachute foot support stirrup as claimed in claim 8 wherein an adjustment buckle is connected to said strap adjacent said connector clamp to provide for adjustment of the length of said strap.

10. A parachute foot support stirrup as claimed in claim 2 wherein said footrest member is constituted by a pair of rigid boots, and an adjustable strap having a connector clamp at opposed ends, one of said clamps connecting to a connector loop secured to said boot, the other of said clamps connecting to a connector ring secured to a nonelastic attachment.

11. A parachute foot support stirrup as claimed in claim 10 wherein said nonelastic attachment is a parachutist's suit.

12. A parachute foot support stirrup as claimed in claim 11 wherein said connector ring is secured to said suit above the knee portion of said suit.

13. A parachute foot support stirrup as claimed in claim 12 wherein an adjustment buckle is secured to said strap for selectively adjusting the length of said strap.

14. A parachute foot support stirrup as claimed in claim 2 wherein said attachment portion is a reeling device secured to said fixed attachment part, said reeling device providing adjustment of the length of said strapping member.

15. A parachute foot support stirrup as claimed in claim 14 wherein a reeling device is provided at opposed ends of said strapping member.

16. A parachute foot support stirrup as claimed in claim 14 wherein said reeling device is secured to a parachute harness webbing.

17. A parachute foot support stirrup as claimed in claim 14 wherein said reeling device is secured to a nonelastic attachment portion of a suit of said parachutist.

18. A parachute foot support stirrup as claimed in claim 14 wherein said strapping member is a flexible nonstretchable strap, said reeling device being provided with adjustment means to release a fixed length of cable which is adjustable to suit the profile of the parachutist.

19. A parachute foot support stirrup as claimed in claim 2 wherein said adjustable portion is provided by a Velcro attachment part secured at a free end of said strapping element for securement to a further mating Velcro part secured to said fixed attachment part.

20. A parachute foot support stirrup as claimed in claim 19 wherein a strapping member loop is provided about each foot of said parachutist, said strapping member being a short strap having one end immovably secured on one side of each foot and having said adjustable portion at its other end, said footrest member being a portion of said strapping member loop extending under said foot.

* * * * *